(12) United States Patent
Freese et al.

(10) Patent No.: US 8,686,080 B2
(45) Date of Patent: Apr. 1, 2014

(54) BIODEGRADABLE POLYESTER FILM

(75) Inventors: Franziska Freese, Mannheim (DE);
Robert Loos, Ludwigshafen (DE);
Jürgen Keck, Speyer (DE); Jörg Auffermann, Freinsheim (DE); Xin Yang, Bensheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/467,550

(22) Filed: May 9, 2012

(65) Prior Publication Data

US 2012/0288650 A1 Nov. 15, 2012

Related U.S. Application Data

(60) Provisional application No. 61/484,234, filed on May 10, 2011.

(51) Int. Cl.
*C08K 3/26* (2006.01)

(52) U.S. Cl.
USPC .......................................................... 524/425

(58) Field of Classification Search
USPC .......................................................... 524/425
See application file for complete search history.

(56) References Cited

U.S. PATENT DOCUMENTS

| | | | |
|---|---|---|---|
| 5,817,721 A | 10/1998 | Warzelhan et al. | |
| 5,863,991 A | 1/1999 | Warzelhan et al. | |
| 5,880,220 A | 3/1999 | Warzelhan et al. | |
| 5,889,135 A | 3/1999 | Warzelhan et al. | |
| 6,018,004 A | 1/2000 | Warzelhan et al. | |
| 6,046,248 A | 4/2000 | Warzelhan et al. | |
| 6,111,058 A | 8/2000 | Warzelhan et al. | |
| 6,120,895 A | 9/2000 | Kowitz et al. | |
| 6,258,924 B1 | 7/2001 | Warzelhan et al. | |
| 6,353,084 B1 | 3/2002 | Warzelhan et al. | |
| 2008/0044650 A1* | 2/2008 | Sukigara et al. | 428/338 |
| 2008/0281018 A1* | 11/2008 | Seeliger et al. | 523/124 |
| 2011/0187029 A1* | 8/2011 | Dietrich et al. | 264/539 |
| 2011/0237750 A1 | 9/2011 | Ren et al. | |
| 2011/0313075 A1 | 12/2011 | Siegenthaler et al. | |

FOREIGN PATENT DOCUMENTS

| | | |
|---|---|---|
| DE | 19912966 A1 | 10/2000 |
| DE | 102007026719 A1 | 12/2008 |
| WO | WO-92/09654 A2 | 6/1992 |
| WO | WO-9615173 A1 | 5/1996 |
| WO | WO-9615174 A1 | 5/1996 |
| WO | WO-9615175 A1 | 5/1996 |
| WO | WO-9615176 A1 | 5/1996 |
| WO | WO-96/21689 A2 | 7/1996 |
| WO | WO-9621690 A1 | 7/1996 |
| WO | WO-9621691 A1 | 7/1996 |
| WO | WO-9621692 A1 | 7/1996 |
| WO | WO-96/25448 A1 | 8/1996 |
| WO | WO-9625446 A1 | 8/1996 |
| WO | WO-9812242 A1 | 3/1998 |
| WO | WO-0216468 A1 | 2/2002 |
| WO | WO-2006/097353 A1 | 9/2006 |
| WO | WO-2006/097354 A1 | 9/2006 |
| WO | WO-2009071475 A1 | 6/2009 |
| WO | WO 2009071475 A1 * | 6/2009 ........... C07D 251/24 |
| WO | WO-2010/034710 A1 | 4/2010 |
| WO | WO-2010034711 A1 | 4/2010 |
| WO | WO-2011/054786 A1 | 5/2011 |

OTHER PUBLICATIONS

U.S. Appl. No. 13/508,658.
European Search Report for EP 11 16 5413 dated Sep. 22, 2011.

\* cited by examiner

*Primary Examiner* — Ling Choi
*Assistant Examiner* — Lanee Reuther
(74) *Attorney, Agent, or Firm* — Novak Druce Connolly Bove + Quigg LLP

(57) ABSTRACT

The present invention relates to a biodegradable polyester film comprising:

i) from 75 to 100% by weight, based on the total weight of components i to ii, of a biodegradable polyester based on aliphatic and/or aromatic dicarboxylic acids and on an aliphatic dihydroxy compound;

ii) from 0 to 25% by weight, based on the total weight of components i to ii, of polylactic acid;

iii) from 10 to 25% by weight, based on the total weight of components i to v, of calcium carbonate;

iv) from 3 to 15% by weight, based on the total weight of components i to v, of talc;

v) from 0 to 1% by weight, based on the total weight of components i to v, of a copolymer which contains epoxy groups and is based on styrene, acrylic ester, and/or methacrylic ester;

vi) from 0 to 2% by weight, based on the total weight of components i to v, of 2-(4,6-bisbiphenyl-4-yl-1,3,5-triazin-2-yl)-5-(2-ethyl-(n)-hexyloxy)phenol.

10 Claims, No Drawings

BIODEGRADABLE POLYESTER FILM

CROSS-REFERENCE TO RELATED APPLICATIONS

This application claims benefit (under 35 USC 119(e)) of U.S. Provisional Application 61/484,234, filed May 10, 2011, which is incorporated by reference.

The Present Invention Relates to a Biodegradable Polyester Film Comprising:

i) from 75 to 100% by weight, based on the total weight of components i to ii, of a biodegradable polyester based on aliphatic and/or aromatic dicarboxylic acids and on an aliphatic dihydroxy compound;

ii) from 0 to 25% by weight, based on the total weight of components i to ii, of polylactic acid;

iii) from 10 to 25% by weight, based on the total weight of components i to v, of calcium carbonate;

iv) from 3 to 15% by weight, based on the total weight of components i to v, of talc;

v) from 0 to 1% by weight, based on the total weight of components i to v, of a copolymer which contains epoxy groups and is based on styrene, acrylic ester, and/or methacrylic ester;

vi) from 0 to 2% by weight, based on the total weight of components i to v, of 2-(4,6-bisbiphenyl-4-yl-1,3,5-triazin-2-yl)-5-(2-ethyl-(n)-hexyloxy)phenol.

The invention further relates to the use of said polyester films and to a masterbatch comprising:

i) from 75 to 95% by weight, based on the total weight of the components, of a biodegradable polyester selected from the group consisting of:
polyesters based on aliphatic and/or on aromatic dicarboxylic acids and on aliphatic dihydroxy compound, and polymer lactic acid;

vi) from 5 to 25% by weight, based on the total weight of the components of 2-(4,6-bisbiphenyl-4-yl-1,3,5-triazin-2-yl)-5-(2-ethyl-(n)-hexyloxy)phenol, and also to a process for producing a preferably transparent mulch film with defined "breakdown time" with use of the abovementioned masterbatch.

The UV absorber (vi) used in the masterbatch is based on an extremely stable chromophore which belongs to the triazines class and which has exceptional absorption capability. This UV absorber is superior to all other currently used UV absorbers in the wavelength range from 290 to 350 nanometers because it has a very high degree of absorption and also a very broad absorption curve. The UV absorber also has excellent light resistance and low volatility, and there is therefore hardly any alteration in absorption capability over the course of time.

WO2002/016468 discloses filled biodegradable polyester films. Said specification does not indicate any combination of the fillers calcium carbonate (component iii) and talc (component iv). The polyester films disclosed in WO2002/016468 are not always fully satisfactory in respect of their processing properties (low film bubble stability) and tear-propagation resistance.

It was therefore an objective of the present invention to develop polyester films with improved tear-propagation resistance which can be reliably processed to give blown films.

Biodegradable polyester films can by way of example be used as mulch films. A decisive requirement here alongside the requirement for high tear-propagation resistance is resistance to insolation, in particular for transparent mulch films. Although black-colored (carbon-black-colored) mulch films absorb UV, thermal radiation is also absorbed, and therefore less heat is transmitted through to the soil and the yield/earlier-harvesting effect that can be achieved, at least for particular crops such as melons and maize, is reduced.

WO 2009/071475 discloses mulch films based on, for example, polyethylene and comprising hydroxyphenyltriazines as stabilizer. WO 2009/071475 likewise mentions polyester films based on PMMA. WO 2009/071475 does not explicitly describe biodegradable polyester films. The service time of biodegradable transparent mulch films based on a biodegradable polyester composed of aliphatic and/or aromatic dicarboxylic acids and of aliphatic dihydroxy compound is often in practice excessively short: only 2 weeks, depending on wall thickness. Light stabilizers such as UV absorbers and HALS stabilizers, or a combination of both, are usually recommended for providing UV stabilization to mulch films. UV absorbers filter the ultraviolet content out from the light, and the energy of the absorbed light is thus converted into heat. The use of HALS stabilizers suppresses the reaction of photooxidatively generated cleavage products in the polymer. The combination of the abovementioned active ingredients achieves a synergistic effect for inhibition of the two different degradation mechanisms. Studies on Ecoflex® semiaromatic polyester (BASF SE) have revealed that even when hydroxyphenyltriazine-based UV absorbers, e.g. Tinuvin® 1577, are combined with a HALS stabilizer, e.g. Tinuvin® 111, or UV absorber based on benzophenones, e.g. Uvinul® 3008, although they provide a certain stabilizing effect, this is by no means fully satisfactory for transparent mulch films, in particular with low wall thickness.

Thin embodiments of said mulch films (below 30 microns) moreover do not have fully satisfactory tear-propagation resistance.

It was therefore an object of the present invention to provide biodegradable, preferably transparent mulch films with longer service times in the field and with higher tear-propagation resistance.

The Biodegradable Polyester Film Comprising:

i) from 75 to 100% by weight, preferably from 80 to 95% by weight, particularly preferably from 85 to 95% by weight, based on the total weight of components i to ii, of a biodegradable polyester based on aliphatic and/or aromatic dicarboxylic acids and on an aliphatic dihydroxy compound;

ii) from 0 to 25% by weight, preferably from 5 to 20% by weight, particularly preferably from 5 to 15% by weight, based on the total weight of components i to ii, of polylactic acid;

iii) from 10 to 25% by weight, preferably from 10 to 20% by weight, particularly preferably from 12 to 17% by weight, based on the total weight of components i to v, of calcium carbonate;

iv) from 3 to 15% by weight, preferably from 5 to 10% by weight, particularly preferably from 5 to 8% by weight, based on the total weight of components i to v, of talc;

v) from 0 to 1% by weight, preferably from 0.01 to 0.8% by weight, particularly preferably from 0.05 to 0.5% by weight, based on the total weight of components i to v, of a copolymer which contains epoxy groups and is based on styrene, acrylic ester, and/or methacrylic ester;

vi) from 0 to 2% by weight, preferably from 0.1 to 1.5% by weight, particularly preferably from 0.5 to 1.2%, based on the total weight of components i to v, of 2-(4,6-bisbiphenyl-4-yl-1,3,5-triazin-2-yl)-5-(2-ethyl-(n)-hexyloxy)phenol has accordingly been developed.

Component vi is useful only for films which have long-term exposure to insolation, for example mulch films.

Comparison of results from Tables 4 and 5 shows that films with from 5 to 20% by weight polylactic acid content, particularly preferably from 5 to 15% by weight, based on the total weight of components i to ii, have particularly high tear-propagation resistance.

Preference is further given to mulch films of claim 3 with components i to vi, which exhibit improvement not only in respect of their tear-propagation resistance but also in respect of their service time in the field.

The invention is described in more detail below.

Materials that can in principle be used as component i for producing the biodegradable polyester mixtures of the invention are any of the polyesters known as semiaromatic polyesters, based on aliphatic and aromatic dicarboxylic acids and on aliphatic dihydroxy compound, and any of the aliphatic polyesters made of aliphatic dicarboxylic acids and of aliphatic diols. A feature common to said polyesters is that they are biodegradable to DIN EN 13432. Mixtures of a plurality of these polyesters are of course also suitable as component i.

In the invention, the expression "semiaromatic polyesters" (component i) is also intended to mean polyester derivatives, such as polyetheresters, polyesteramides, or polyetheresteramides, and polyester urethanes. Among the suitable semiaromatic polyesters are linear non-chain-extended polyesters (WO 92/09654). Preference is given to chain-extended and/or branched semiaromatic polyesters. The latter are known from the specifications mentioned in the introduction, WO 96/15173 to 15176, 21689 to 21692, 25446, 25448, or WO 98/12242, expressly incorporated herein by way of reference. It is also possible to use mixtures of various semiaromatic polyesters. Relatively recent developments of interest are based on renewable raw materials (see WO-A 2006/097353, WO-A 2006/097354, also WO-A 2010/034710). The expression "semiaromatic polyesters" in particular means products such as Ecoflex® (BASF SE) and Eastar® Bio, and Origo Bi® (Novamont).

Among the particularly preferred semiaromatic polyesters are polyesters which comprise, as essential components, A) an acid component made of:
a1) from 30 to 99 mol % of at least one aliphatic dicarboxylic acid or ester-forming derivatives thereof, or a mixture thereof,
a2) from 1 to 70 mol % of at least one aromatic dicarboxylic acid or ester-forming derivative thereof, or a mixture thereof, and
B) from 98 to 102 mol %, based on acid component A, of a diol component B selected from at least one $C_2$-$C_{12}$-alkanediol or a mixture thereof
and
C) from 0.01 to 3% by weight, based on components A and B, of a component C selected from
c1) a compound having at least three groups capable of ester formation or of amide formation,
c2) a di- or polyisocyanate,
c3) a di- or polyepoxide,
or a mixture made of c1) to c3).

Compounds which can be used as aliphatic acids or as the corresponding derivatives a1 are generally those having from 2 to 18 carbon atoms, preferably from 4 to 10 carbon atoms. They can be either linear or branched compounds. In principle, however, it is also possible to use dicarboxylic acids having a larger number of carbon atoms, for example having up to 30 carbon atoms.

Examples that may be mentioned are: oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxaloacetic acid, glutamic acid, aspartic acid, itaconic acid, and maleic acid. It is possible here to use the dicarboxylic acids or ester-forming derivatives thereof, individually or in the form of a mixture made of two or more thereof.

It is preferable to use succinic acid, adipic acid, azelaic acid, sebacic acid, brassylic acid, or respective ester-forming derivatives thereof, or a mixture thereof. It is particularly preferable to use succinic acid, adipic acid, or sebacic acid, or respective ester-forming derivatives thereof, or a mixture thereof. Succinic acid, azelaic acid, sebacic acid, and brassylic acid have the additional advantage that they are obtainable from renewable raw materials.

Particular preference is given to the following aliphatic-aromatic polyesters:

polybutylene adipate terephthalate (PBAT), polybutylene sebacate terephthalate (PBSeT), and polybutylene succinate terephthalate (PBST).

The aromatic dicarboxylic acids or ester-forming derivatives thereof a2 can be used individually or in the form of a mixture made of two or more thereof. It is particularly preferable to use terephthalic acid or ester-forming derivatives thereof, e.g. dimethyl terephthalate.

The diols B are generally selected from branched or linear alkanediols having from 2 to 12 carbon atoms, preferably from 4 to 6 carbon atoms, or from cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, and in particular ethylene glycol, 1,3-propanediol, 1,4-butanediol, and 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol, and 2,2,4,4-tetramethyl-1,3-cyclobutanediol. Particular preference is given to 1,4-butanediol, particularly in combination with adipic acid as component a1), and 1,3-propanediol, particularly in combination with sebacic acid as component a1). 1,3-Propanediol also has the advantage that it is obtainable in the form of renewable raw material. It is also possible to use a mixture of various alkanediols.

The preferred semiaromatic polyesters are characterized by a molar mass ($M_n$) in the range from 1000 to 100 000 g/mol, in particular in the range from 9000 to 75 000 g/mol, preferably in the range from 10 000 to 50 000 g/mol, and by a melting point in the range from 60 to 170° C., preferably in the range from 80 to 150° C.

The expression "aliphatic polyesters" (component i) means polyesters made of aliphatic diols and of aliphatic dicarboxylic acids, e.g. polybutylene succinate (PBS), polybutylene adipate (PBA), polybutylene succinate adipate (PBSA), polybutylene succinate sebacate (PBSSe), and polybutylene sebacate (PBSe), or corresponding polyester amides or polyester urethanes. The aliphatic polyesters are marketed by way of example by Showa Highpolymers as Bionolle and by Mitsubishi as GSPIa. WO-A 2010/034711 describes more recent developments.

The polyesters in component i can also comprise mixtures made of aliphatic-aromatic polyesters and of purely aliphatic polyesters, examples being mixtures made of PBAT and PBS.

Component ii in particular comprises polylactic acid (PLA).

It is preferable to use polylactic acid with the following property profile:

melt volume rate (MVR for 190° C. and 2.16 kg to ISO 1133) of from 0.5—preferably from 2—to 30 ml/10 minutes, in particular 9 ml/10 minutes melting point below 240° C.;
glass transition temperature (Tg) above 55° C.
water content smaller than 1000 ppm
residual monomer content (Lactid) smaller than 0.3%
molecular weight above 80 000 daltons.

Examples of preferred polylactic acids are NatureWorks® 6201 D, 6202 D, 6251 D, 3051 D, and in particular 4020 D or 4043D (polylactic acid from NatureWorks).

The amount used of component ii is from 0 to 25% by weight, based on components i and ii, preferably from 5 to 20% by weight and with particular preference from 5 to 15% by weight.

It is preferable to use, as component iii, from 10 to 25% by weight, particularly from 12 to 18% by weight, based on the total weight of components i to v, of calcium carbonate. The calcium carbonate from Omya has proven to be suitable inter alia. The average particle size of the calcium carbonate is generally from 0.5 to 10 micrometers, preferably from 1 to 5 micrometers, particularly preferably from 1 to 2.5 micrometers.

From 3 to 15% by weight, preferably from 5 to 10% by weight, particularly preferably from 5 to 8% by weight, based on the total weight of components i to v, of talc is used as component iv. The talc from Mondo Minerals has proven to be suitable inter alia. The average particle size of the talc is generally from 0.5 to 10 micrometers, preferably from 1 to 8 micrometers, particularly preferably from 1 to 3 micrometers.

Interestingly, it has been found that the addition of calcium carbonate iii (chalk) can achieve a further improvement in the biodegradability of the products. Talc iv in turn provides an effective method of increasing the modulus of elasticity.

The entirety of the fillers iii) and iv), based on the total weight of components i to v, is generally from 13 to 40% by weight, preferably from 15 to 30% by weight, and with particular preference from 18 to 25% by weight.

It may also be possible to add to the polymer mixtures, in particular to the polylactic-acid-containing mixtures, from 0 to 1% by weight, preferably from 0.01 to 0.8% by weight, particularly preferably from 0.05 to 0.5% by weight, based on the total weight of components i to v, of a copolymer which contains epoxy groups and which is based on styrene, acrylate, and/or methacrylate (component v). The units bearing epoxy groups are preferably glycidyl(meth)acrylate. Copolymers that have proven advantageous are those having glycidyl methacrylate content greater than 20% by weight, particularly preferably greater than 30% by weight, and with particular preference greater than 50% by weight, based on the copolymer. The epoxy equivalent weight (EEW) in said polymers is preferably from 150 to 3000 g/equivalent, and with particular preference from 200 to 500 g/equivalent. The average molecular weight (weight-average) $M_W$ of the polymers is preferably from 2000 to 25 000, in particular from 3000 to 8000. The average molecular weight (number-average) $M_n$ of the polymers is preferably from 400 to 6000, in particular from 1000 to 4000. Polydispersity (Q) is generally from 1.5 to 5. Copolymers of the abovementioned type containing epoxy groups are marketed by way of example by BASF Resins B.V. with trademark Joncryl® ADR. Joncryl® ADR 4368 is particularly suitable. Component v is in particular used in PLA-containing polyester mixtures.

From 0 to 2% by weight, preferably from 0.1 to 1.5% by weight, particularly preferably from 0.5 to 1.2% by weight, based on the total weight of components i to vi, of 2-(4,6-bisbiphenyl-4-yl-1,3,5-triazin-2-yl)-5-(2-ethyl-(n)-hexyloxy)phenol is used as component vi. WO 2009/071475 discloses production and properties of the UV absorber vi. Explicit reference may be made to WO 2009/071475 in this connection.

The polyester film of the invention can moreover comprise other additives known to the person skilled in the art, for example the additives conventional in plastics technology, e.g. stabilizers; nucleating agents; lubricants and release agents, such as stearates (in particular calcium stearate); plasticizers, such as citrates (in particular tributyl acetylcitrate), glycerol esters, such as triacetylglycerol, or ethylene glycol derivatives, surfactants, such as polysorbates, palmitates, or laurates; waxes, e.g. erucamide, stearamide, or behenamide, beeswax, or beeswax esters; antistatic agent, UV absorbers; UV stabilizers; antifogging agents, or dyes. The concentrations used of the additives are from 0 to 5% by weight, in particular from 0.1 to 2% by weight, based on the polyesters of the invention. The polyesters of the invention can comprise from 0.1 to 10% by weight of plasticizers.

For the purposes of the present invention, a substance or substance mixture complies with the "biodegradable" feature if the percentage degree of biodegradation of said substance or the substance mixture to DIN EN 13432 is at least 90%.

Biodegradation generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. Biodegradability can be quantified by way of example by mixing polyester with compost and storing it for a particular period. By way of example, in DIN EN 13432 (with reference to ISO 14855), $CO_2$-free air is passed through ripened compost during the composting process, and the compost is subjected to a defined temperature profile. Biodegradability here is defined as a percentage degree of biodegradation, by taking the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit clear signs of degradation after just a few days of composting, examples being fungal growth, cracking, and perforation.

Other methods of determining biodegradability are described by way of example in ASTM D5338 and ASTM D6400-4.

The biodegradable films mentioned in the introduction are suitable for producing nets and fabric, blown films, and chill-roll films, with or without any orientation, in a further processing step, and with or without metallization, or SiOx coating.

In particular, the polyester films mentioned in the introduction comprising components i) to v) or, respectively, i) to vi) are suitable for blown films and stretch films. Possible applications here are basal-fold bags, lateral-seam bags, carrier bags with hole grip, shrink labels, or vest-style carrier bags, inliners, heavy-duty bags, freezer bags, composting bags, agricultural films (mulch films), film bags for food packaging, peelable closure film—transparent or opaque—weldable closure film—transparent or opaque, sausage casing, salad film, freshness-retention film (stretch film) for fruit and vegetables, meat, and fish, stretch film for pallet-wrapping, net film, packaging films for snacks, chocolate bars, and muesli bars, peelable lid films for dairy packaging (yoghurt, cream, etc.), fruit, and vegetables, semirigid packaging for smoked sausage and for cheese.

When the polyester films comprising components i to vi) have been extruded to give single- or multilayer blown, cast, or pressed films they exhibit markedly higher tear resistance (to EN ISO 6383-2:2004) in comparison with mixtures without components ii to v). Tear-propagation resistance is a very important product property especially in the sector of thin (blown) films for, for example, biodegradable-waste bags, or thin-walled carrier bags (e.g. vest-style carrier bags, fruit bags). It is also particularly important in mulch films in the agricultural sector.

Polyester films provided with light stabilizer vi) are in particular used for outdoor applications, for example in the construction sector and in particular for agricultural products. The expression "agricultural products" means mulch films, protective covering films, silo films, film strips, fabrics, nonwovens, clips, textiles, threads, fishing nets and wrapping, e.g. heavy-duty bags for, for example, peat, fertilizer, cement, plant-protection agents, or seed, or for flower pots.

Agricultural products generally have exposure to wind and weathering, and in particular to insolation. They require stabilization in order to provide a defined service time in the field. Component vi) has proven to be particularly efficient here. A masterbatch comprising:

i) from 75 to 95% by weight, based on the total weight of the components i to v, of a biodegradable polyester based on aliphatic and/or on aromatic dicarboxylic acids and on aliphatic dihydroxy compound;

vi) from 5 to 25% by weight, based on the total weight of the components i to v, of 2-(4,6-bisbiphenyl-4-yl-1,3,5-triazin-2-yl)-5-(2-ethyl-(n)-hexyloxy)phenol;

has proven to be particularly helpful in producing mulch films which are preferably transparent or translucent.

In particular, a process has been found for producing transparent mulch films comprising:

i) from 75 to 100% by weight, based on the total weight of components i to ii, of a biodegradable polyester based on aliphatic and/or aromatic dicarboxylic acids and on an aliphatic dihydroxy compound;

ii) from 0 to 25% by weight, based on the total weight of components i to ii, of polylactic acid;

iii) from 10 to 25% by weight, based on the total weight of components i to v, of calcium carbonate;

iv) from 3 to 15% by weight, based on the total weight of components i to v, of talc;

v) from 0 to 1% by weight, based on the total weight of components i to v, of a copolymer which contains epoxy groups and is based on styrene, acrylic ester, and/or methacrylic ester;

vi) from 0.1 to 1.5% by weight, based on the total weight of components i to v, of 2-(4,6-bisbiphenyl-4-yl-1,3,5-triazin-2-yl)-5-(2-ethyl-(n)-hexyloxy)phenol.

With the aid of the masterbatch it is possible to adjust to a defined service time, depending on the layer thickness of the mulch film and on the climatic zone in which the mulch film is to be used. The weathering test to DIN EN ISO 4892-2 can serve as a measure here. The film is exposed to a xenon arc lamp for a period of 250 h. This corresponds to 3 months of outdoor weathering in the southern European climatic zone.

Performance Testing:

The molecular weights Mn and Mw of the semiaromatic polyesters were determined to DIN 55672-1 with eluate hexafluoroisopropanol (HFIP)+0.05% by weight of potassium trifluoroacetate; narrowly distributed polymethyl methacrylate standards were used for calibration. Intrinsic viscosities were determined to DIN 53728, Part 3, Jan. 3, 1985, Capillary viscosimetry. An M-II Ubbelohde viscometer was used. The solvent used was the following mixture: phenol/o-dichlorobenzene in a ratio of 50/50 by weight.

Modulus of elasticity and tensile strain at break were determined by means of a tensile test on pressed films of thickness about 420 μm to ISO 527-3: 2003.

Tear propagation resistance was determined by an Elmendorf test to EN ISO 6383-2: 2004 on test specimens with constant radius (tear length 43 mm), using equipment from ProTear.

A puncture resistance test on pressed films of thickness 420 μm was used to measure maximum force and fracture energy of the polyesters:

The test machine used is a Zwick 1120 equipped with a spherical punch of diameter 2.5 mm. The specimen, a circular piece of the film to be tested, was clamped perpendicularly with respect to the test punch, and the punch was moved at a constant test velocity of 50 mm/min through the plane clamped by the clamping device. Force and elongation were recorded during the test and were used to determine penetration energy.

The degradation rates of the biodegradable polyester mixtures and of the mixtures produced for comparison were determined as follows:

The biodegradable polyester mixtures and the mixtures produced for comparison were pressed at 190° C. in each case to produce films of thickness 30 μm. Each of said films was cut into square pieces with edge lengths of 2×5 cm. The weight of each of these pieces of film was determined and defined as "100% by weight". The pieces of film were heated to 58° C. in an oven for a period of four weeks in a plastics jar filled with a moistened compost. At weekly intervals, the residual weight of each piece of film was measured and converted to % by weight (based on the weight defined as "100% by weight" determined at the start of the experiment).

Masterbatch Production (Light Stabilizer)

I. Materials Used:

A1) Polybutylene Adipate Terephthalate

To produce the polyester A1, 87.3 kg of dimethyl terephthalate, 80.3 kg of adipic acid, 117 kg of 1,4-butanediol, and 0.2 kg of glycerol were mixed together with 0.028 kg of tetrabutyl orthotitanate (TBOT), where the molar ratio of alcohol components to acid components was 1.30. The reaction mixture was heated to a temperature of 180° C. and reacted for 6 h at said temperature. The temperature was then increased to 240° C., and the excess dihydroxy compound was removed by distillation in vacuo over a period of 3 h. 0.9 kg of hexamethylene diisocyanate were then slowly metered into the mixture within a period of 1 h at 240° C.

The melting point of the resultant polyester A1 (component i-1) was 119° C. and its molar mass ($M_n$) was 23 000 g/mol.

B1-B13) Light stabilizers, UV absorbers (UVA), and UV stabilizers (HALS) of Table 1:

TABLE 1

| No. | Name | Type | Chemical name |
|---|---|---|---|
| Light stabilizer of the invention | | | |
| B1 | CGX UVA 006 (WO2009/071475, Example A) | UVA | 2-(4,6-bisbiphenyl-4-yl-1,3,5-triazin-2-yl)-5-(2-ethylhexyloxy)phenol |
| Comparative systems | | | |
| B2 | TINUVIN P CAS No.: 2440-22-4 | UVA | 2-(2H-benzotriazol-2-yl)-p-cresol |
| B3 | TINUVIN 234 CAS No.: 70321-86-7 | UVA | 2-(2H-benzotriazol-2-yl)-4,6-bis (1-methyl-1-phenylethyl)phenol |
| B4 | TINUVIN 312 CAS No.: 23949-66-8 | UVA | N-(2-ethoxyphenyl)-N'-(2-ethylphenyl)oxamide |
| B5 | TINUVIN 326 CAS No.: 3896-11-5 | UVA | 2-(3-tert-butyl-2-hydroxy-5-methylphenyl)-5-chloro-2H-benzotriazole |
| B6 | TINUVIN 360 CAS No.: 103597-451-1 | UVA | 2,2'-methylenebis(6-(2H-benzotriazol-2-yl)-4-(1,1,3,3-tetramethylbutyl)phenol |

TABLE 1-continued

| No. | Name | Type | Chemical name |
|---|---|---|---|
| B7 | TINUVIN 1577 CAS No.: 147315-50-2 | UVA | 2-(4,6-diphenyl-1,3,5-triazin-2-yl)-5-[(hexyl)oxy]phenol |
| B8 | CHIMASSORB 81 CAS No.: 1843-05-6 | UVA | benzophenone |
| B9 | Uvinul 3030 CAS No.: 178671-58-4 | UVA | 2-cyano-3,3-diphenyl-2-propenoic acid, 2,2-bis[[(2-cyano-1-oxo-3,3-diphenyl-2-propenyl)oxy]methyl]-1,3-propanediyl ester |
| B10 | CHIMASSORB 944 CAS No.: 71878-19-8 | HALS | |
| B11 | TINUVIN NOR 371 | HALS | HALS triazine derivative |
| B12 | TINUVIN 111 CAS No.: 106990-43-6 and 65447-77-0 | HALS | |
| B13 | TINUVIN 622 CAS No.: 65447-77-0 | HALS | |

II. Compounding of Masterbatches MB1 and C-MB2 to C-MB13:

9000 g of A1 and respectively 1000 g of B1-B13 were compounded at a melt temperature of about 220-260° C. in a Werner & Pfleiderer MC-26 extruder. A1 was metered by the cold-feed method into zone 0 and B1-B13 was metered by the side-feed method into zone 4, and the entrained air was removed via vacuum devolatilization in reverse direction in zone 3.

The resultant masterbatches were termed MB1 and C-MB2 to C-MB13.

III. Film Production:

Blown-Film System 1

The blown-film system was operated with an extruder of length 30D, using a 75 mm screw equipped with a cooled, grooved feed zone and with a barrier screw having Maddock shear mixing elements and crosshole mixing elements. The zone temperatures were selected in such a way as to give a melt temperature of from 170 to 190° C. The die temperatures were in the range 165-170° C. Die diameter was 225 mm, gap width was 1.5 mm, throughput was 140 kg/h, melt temperature was 188° C., and melt pressure prior to the sieve was 185 bar. The blow-up ratio of 4.0:1 gave a film bubble with laid-flat width 1400 mm. Other components of the system were as follows:

gravimetric feed unit for 4 components (batch mixer)
capacitive thickness measurement
thickness control by way of segment cooling ring
double-lip cooling ring
internal and external cooling by cooled air
2 winding units.

Blown-Film System 2

The blown-film system was operated with an extruder of length 25D, using a 45 mm screw equipped with a grooved feed zone and a three-zone screw with shearing and mixing section. The feed zone was cooled with cold water at maximum throughput. The zone temperatures were selected in such a way as to give a melt temperature of from 170 to 190° C. The die temperatures were in the range of 165-185° C. Die diameter was 75 mm, gap width was 0.8 mm. The blow-up ratio of 3.5:1 gave a film bubble with laid-flat width 412 mm.

IV. Effect of Light Stabilizers

Materials Used 1-i) Semiaromatic polyester A1

2-i) Masterbatch A: 10% strength by weight masterbatch of erucamide in polyester A1

2-ii) Masterbatch B: 60% strength by weight masterbatch of calcium carbonate in polyester A1

2-iii) Masterbatch C: 25% strength by weight masterbatch of pigment black in polyester A1

3-i) MB1 and C-MB2 to C-MB13: 10% strength by weight masterbatch of light stabilizer in polyester A1

The materials were then processed in film system 2 as blend of components 1-i, 2-i, 2-ii, and 3-i (by the cold-feed system in the extruder) to give films of thickness 12 µm. The respective light-stabilizer masterbatches MB1 and C-MB2 to C-MB13 were metered at a concentration of 10% into the mixture, and this corresponded to a concentration of 10 000 ppm of active ingredient in the film. HALS stabilizers or combinations made of HALS and UVA with addition of component 2-iii) were also used for some selected black-colored films. The film samples were then subjected to artificial weathering (xenon arc lamp) to DIN EN ISO 4892-2, method A for a period of 250 h (corresponding to 3 months of outdoor weathering in the south-European climatic zone), and after weathering were tensile-tested to ISO 527-3. The results were compared with those from an unweathered reference film. The assessment of mechanical properties for films after weathering was as follows: films exhibiting more than 50% decrease in tensile strain at break after the weathering period were generally of no further use at least after the simulated period:

ΔL [%]=L1/L2

ΔL: residual tensile strain at break

L1: tensile strain at break to ISO 527-3 of reference film, in this case unweathered film (334%)

L2: tensile strain at break to ISO 527-3 of weathered film

The results for tensile strain at break determined in the tensile tests on the 12 µm films from experiments Nos. 1-14 were compared with the tensile strain at break of an unweathered film based on the following components: 97% 1-i+1% 2-i+2% 2-ii (transparent film). Table 2 collates the formulations and results:

TABLE 2

| No. | Blend | UVA/HALS type | ΔL [%] |
|---|---|---|---|
| Experiment using masterbatch of the invention | | | |
| 1 | 87% 1-i + 1% 2-i + 2% 2-ii + 10% MB1 | Biphenylhydroxy-phenyltriazine (HPT) | 97% |
| Experiments using comparative masterbatches | | | |
| 2 | 87% 1-i + 1% 2-i + 2% -2-ii + 10% C-MB2 | Benzotriazole | 40% |
| 3 | 87% 1-i + 1% 2-i + 2% 2-ii + 10% C-MB3 | Benzotriazole | 43% |
| 4 | 87% 1-i + 1% 2-i + 2% 2-ii + 10% C-MB4 | Oxanilide | 50% |
| 5 | 87% 1-i + 1% 2-i + 2% 2-ii + 10% C-MB5 | Benzotriazole | 60% |
| 6 | 87% 1-i + 1% 2-i + 2% 2-ii + 10% C-MB6 | Benzotriazole | 55 |

TABLE 2-continued

| No. | Blend | UVA/HALS type | ΔL [%] |
|---|---|---|---|
| 7 | 87% 1-i + 1% 2-i + 2% 2-ii + 10% C-MB7 | Hydroxyphenyl-triazine (HPT) | 51 |
| 8 | 87% 1-i + 1% 2-i + 2% 2-ii + 10% C-MB8 | Benzophenone | 70% |
| 9 | 87% 1-i + 1% 2-i + 2% 2-ii + 10% C-MB9 | Cyanoacrylate | 55% |
| 10 | 87% 1-i + 1% 2-i + 2% 2-ii + 10% C-MB10 | HALS | 20% |
| 11 | 87% 1-i + 1% 2-i + 2% 2-ii + 10% C-MB11 | HALS | not measurable |
| 12 | 87% 1-i + 1% 2i + 2% 2-ii + 10% C-MB12 | HALS | not measurable |
| 13 | 87% 1-i + 1% 2-i + 2% 2-ii + 10% C-MB13 | HALS | not measurable |
| 14 | 81% 1-i + 1% 2-i + 2% 2-ii + 10% C-MB7 + 6% C-MB13 | Hydroxyphenyl-triazine (HPT)/HALS combination | 40% |

The results clearly show that UV absorbers based on benzotriazole have some degree of light-stabilizing effect on the films produced, but this is not adequate in particular for very thin transparent mulch films which moreover undergo extension and also thinning during laying. HALS stabilizers do not provide any stabilization with respect to UV radiation even when combined with UV absorbers.

The stabilizing effect of benzophenone UV absorbers on semiaromatic polyesters A1 is confirmed, as described above in the introduction. Even after 250 h of artificial weathering, the tensile strain at break achieved is still 70% of that of the reference film (unweathered); however, the tension-tensile strain curve exhibits a pronounced yield point (ductile behavior). The value reached by the tear resistance is also only 10 MPa, which is largely below the tear resistance of the reference film: about 34 MPa.

Excellent UV stabilization can be achieved by using the masterbatch of the invention, comprising the light stabilizer 2-(4,6-bisbiphenyl-4-yl-1,3,5-triazin-2-yl)-5-(2-ethyl-(n)-hexyloxy)phenol (MB1). Even after 250 h of artificial weathering, tensile strain at break corresponds approximately to the value measured for the reference film. The tension-tensile strain curve also exhibits no yield point. The triazine-based chromophore therefore provides very reliable stabilization of very thin films based on semiaromatic polyesters A1. The intensity of UV absorption depends on the concentration of active ingredient and on the wall thickness of the film. It is likely that adequate UV stability can be provided to even thinner films <12 μm. In the case of thicker films it is moreover possible to reduce the concentration of active ingredient, when comparison is made with the benzophenone. The light stabilizer exhibits, as mentioned above, inherent lightfastness, and little susceptibility to migration when comparison is made with benzophenones. Both properties contribute to reliable stabilization of the films.

The very good and reproducible results that can be achieved with the MB1 of the invention can firstly provide a process in which the service time of mulch films in the field can be specifically tailored, depending on layer thickness and on average level of insolation. It thus becomes possible to use biodegradable, transparent or translucent films for crops which have relatively long vegetation periods and which therefore were not accessible or not economically accessible.

In the case of black-colored films, the light stabilizer masterbatch MB1 of the invention exhibited very good light stabilizer effect even at relatively low concentration. HALS compounds such as Chimasorb 944 (B8) exhibited ideal UV stabilization—alone or in combination with the light stabilizer of the invention.

Examples Providing Evidence of the Effect of the Light Stabilizer:

Materials Used:
i-1) semiaromatic polyester A1
ii-1) polylactic acid (PLA) 4043D from Natureworks LLC
iii-1) calcium carbonate with topcut (d 98%) 5 μm from OMYA
iv-1) talc with topcut (d 98%) 8 μm from Mondo Minerals
v-1) Masterbatch A: 20% strength by weight masterbatch of Joncryl ADR 4368 in polyester A1 (see EP-A 1838784 for production process)
vi-1) Masterbatch MB1: 10% strength by weight masterbatch of light stabilizer B1 in polyester A1, where light stabilizer B1 corresponds to Example A of WO 2009/071475
vi-V2) Masterbatch C-MB8: 10% strength by weight masterbatch of light stabilizer B8 in polyester A1.

670 kg of i-1, 75 kg of ii-1, 180 kg of iii-1, 70 kg of iv-1, and 5 kg of v-1 were compounded at a melt temperature of about 220-260° C. in a Werner & Pfleiderer MC-26 extruder. i-1, ii-1 and v-1 were metered by the cold-feed method into zone 0 and iii-1 and iv-1 were metered by the side-feed method into zone 4, and the entrained air was removed via vacuum devolatilization in reverse direction in zone 3.

The compounded material was then processed on film system 2 with addition of component vi-1 and, respectively, vi-C2 to give blown films of thickness 12, 20, 50, and 100 micrometers. The film samples were then subjected by analogy with the masterbatch films described above to artificial weathering (xenon arc lamp) to DIN EN ISO 4892-2, Method A for a period of 250 h (corresponding to 3 months of outdoor weathering in the southern European climatic zone), and, after weathering, tensile-tested to ISO 527-3.

TABLE 3

| No. | Blend | Film thickness | ΔL [%] |
|---|---|---|---|
| 1 | 100% compounded material | 12 μm | 4% |
| 2 | 100% compounded material | 20 μm | 2% |
| 3 | 100% compounded material | 50 μm | 2% |
| 4 | 100% compounded material | 100 μm | 2% |
| 5 | 97% compounded material + 3% vi-C2 | 12 μm | 4% |
| 6 | 97% compounded material + 3% vi-C2 | 20 μm | 4% |
| 7 | 97% compounded material + 3% vi-C2 | 50 μm | 7% |
| 8 | 97% compounded material + 3% vi-C2 | 100 μm | 56% |
| 9 | 95% compounded material + 5% vi-C2 | 12 μm | 10% |

TABLE 3-continued

| No. | Blend | Film thickness | ΔL [%] |
|---|---|---|---|
| 10 | 90% compounded material + 10% vi-C2 | 12 μm | 15% |
| 11 | 97% compounded material + 3% vi-1 | 12 μm | 10% |
| 12 | 97% compounded material + 3% vi-1 | 20 μm | 12% |
| 13 | 97% compounded material + 3% vi-1 | 50 μm | 57% |
| 14 | 97% compounded material + 3% vi-1 | 100 μm | 92% |
| 15 | 95% compounded material + 5% vi-1 | 12 μm | 20% |
| 16 | 90% compounded material + 10% vi-1 | 12 μm | 55% |

Again, the results in Table 3 clearly show the favorable effect of the masterbatch of the invention based on the light stabilizer 2-(4,6-bisbiphenyl-4-yl-1,3,5-triazin-2-yl)-5-(2-ethyl-(n)-hexyloxy)phenol (Table 1: No. B1; Table 3: vi-1). Again, in the compounded materials of the invention based on components i-1, ii-1, iii-1 and iv-1, the films stabilized with masterbatch MB-1 of the invention (vi-1) performed markedly better than the films stabilized with the comparative system C-MB8 (vi-C2). The intensity of UV absorption depends on the concentration of active ingredient and on the wall thickness of the film. Transparent films of thickness starting from 50 micrometers can be stabilized by a concentration of as little as about 3000 ppm of light stabilizer vi-1. Very thin transparent films based on the compounded material require a concentration of about 10 000 ppm of light stabilizer vi-1 in the abovementioned experiment.

EXAMPLES PROVIDING EVIDENCE OF THE IMPROVED TEAR RESISTANCE OF THE FILMS OF THE INVENTION

Inventive Example 1

720 kg of i-1 (polyester A1), 80 kg of ii-1 (PLA), 140 kg of iii-1 (calcium carbonate), and 60 kg of iv-1 (talc) were compounded at a melt temperature of about 220-260° C. in a Leistritz extruder with L/D ratio of 46. The fillers iii-1 and iv-1 were fed in zones 3 and 6, and the remainder was fed by the cold-feed method in zone 0. Entrained air and low-molecular-weight components were removed via vacuum devolatilization in reverse direction in zone 10. The compounded material was then processed in film system 1 with addition of 7% by weight of vi-1 (masterbatch MB1) (by the cold-feed method at the compounding extruder) to give a film of thickness 12 micrometers and width 1400 mm, the speed of the system being 56 m/min. The film could be processed without difficulty, and the stability of the film bubble was assessed as good.

Inventive Example 2

715 kg of i-1 (polyester A1), 80 kg of ii-1 (PLA), 140 kg of iii-1 (calcium carbonate), 60 kg of iv-1 (talc), and also 5 kg of v-1 (Joncryl masterbatch) were compounded at a melt temperature of about 220-260° C. in a Leistritz extruder with L/D ratio of 46. The fillers iii-1 and iv-1 were fed in zones 3 and 6, and the remainder was fed by the cold-feed method in zone 0. Entrained air and low-molecular-weight components were removed via vacuum devolatilization in reverse direction in zone 10. The compounded material was then processed in film system 1 with addition of 7% by weight of vi-1 (masterbatch MB1) (by the cold-feed method at the compounding extruder) to give a film of thickness 12 micrometers and width 1400 mm, the speed of the system being 56 m/min. The film could be processed without difficulty, and the stability of the film bubble was assessed as very good.

Comparative Example 1

720 kg of i-1 (polyester A1), 80 kg of ii-1 (PLA), 200 kg of iii-1 (calcium carbonate) were compounded at a melt temperature of about 220-260° C. in a Leistritz extruder with L/D ratio of 46. The filler iii-1 was fed in zone 3, and the remainder was fed by the cold-feed method in zone 0. Entrained air and low-molecular-weight components were removed via vacuum devolatilization in reverse direction in zone 10. The compounded material was then processed in film system 1 with addition of 7% by weight of vi-1 (masterbatch MB1) (by the cold-feed method at the compounding extruder) to give a film of thickness 12 micrometers and width 1400 mm, the speed of the system being 56 m/min. The film was initially very unstable and could not be processed at this thickness until some stabilization measures had been adopted (e.g. lowering the calibration basket). The stability of the film bubble can therefore be evaluated as no more than adequate.

The results of the tear-propagation experiments of Inventive examples 1 and 2, and also of Comparative example 1, have been collated in Table 4. It is clearly seen that Inventive example 1 (combination of fillers iii-1 and iv-1) and the particularly preferred embodiment in Inventive example 2 (combination of iii-1 and iv-1, and also addition of v-1) exhibit significantly better tear-propagation resistances than Comparative example 1 (addition exclusively of iii-1), not only in machine direction (MD) but also especially in cross direction (CD).

TABLE 4

| Test | Film thickness | Inv. ex. 1 | Inv. ex. 2 | Comp. ex. 1 |
|---|---|---|---|---|
| Elmendorf test*, machine direction (MD) | 12 μm | 936 mN | 1309 mN | 874 mN |
| Elmendorf test*, cross direction (CD) | 12 μm | 878 mN | 1010 mN | 445 mN |
| Elmendorf test*, machine direction (MD) | 23 μm | — | 1782 mN | 1657 mN |
| Elmendorf test*, cross direction (CD) | 23 μm | — | 1949 mN | 810 mN |

*Standard: EN ISO 6383-2:2004

Inventive Example 3

9720 g of i-1 (polyester A1), 2160 g of ii-1 (PLA), 2250 g of iii-1 (calcium carbonate), 750 g of iv-1 (talc), and 120 g of v-1 (Joncryl masterbatch) were compounded at melt temperature about 220-260° C. in a Werner & Pfleiderer MC-26 extruder. Components i-1, ii-1, and v-1 were fed by the cold-feed method in zone 0, the fillers iii-1 and iv-1 were metered into the mixture by the side-feed method in zone 4, and entrained air was removed via vacuum devolatilization in reverse direction in zone 3.

The compounded material was then processed in film system 2 to give a blown film of thickness 30 micrometers.

Comparative Example 2

9690 g of i-1 (polyester A1), 2160 g of ii-1 (PLA), 3000 g of iii-1 (calcium carbonate), and 150 g of v-1 (Joncryl masterbatch) were compounded at melt temperature about 220-260° C. in a Werner & Pfleiderer MC-26 extruder. Components i-1, ii-1, and v-1 were fed by the cold-feed method in zone 0, the filler iii-1 was metered into the mixture by the side-feed method in zone 4, and entrained air was removed via vacuum devolatilization in reverse direction in zone 3.

The compounded material was then processed in film system 2 to give a blown film of thickness 30 micrometers.

Comparative Example 3

24.3 kg of i-1 (polyester A1), 5.4 kg of ii-1 (PLA), and 0.3 kg of v-1 (Joncryl masterbatch) were compounded at melt temperature about 220-260° C. in a Werner & Pfleiderer MC-26 extruder. All of the starting materials were metered into the mixture by the cold-feed method.

The compounded material was then processed in film system 2 to give a blown film of thickness 30 micrometers.

Table 5 collates the testing of tear-propagation resistances of Inventive example 3 and of Comparative examples 2 and 3. It is clearly seen that Inventive example 3 has significantly better tear-propagation resistance in machine direction (MD) than Comparative examples 2 and 3, more than compensating for the somewhat smaller value in cross direction.

TABLE 5

| Test | Film thickness | Inv. ex. 3 | Comp. ex. 2 | Comp. ex. 3 |
| --- | --- | --- | --- | --- |
| Elmendorf test*, machine direction (MD) | 30 μm | 1628 mN | 1100 mN | 735 mN |
| Elmendorf test*, cross direction (CD) | 30 μm | 635 mN | 717 mN | 604 mN |

*Standard: EN ISO 6383-2:2004

Comparison of the results from Tables 4 and 5 also shows that, for similar filler concentrations, the films specified in Table 5 (with relatively high content of component ii-1 (PLA) in the polymer matrix) have markedly poorer tear-propagation resistances than the films from Table 4. Tear-propagation resistance does not have linear correlation with film thickness and normally increases more than proportionally in thicker films, and the difference is therefore actually more pronounced than might be implied by comparison of the pure numerical values. The relatively small proportion of ii-1 in Inventive examples 1 and 2 is therefore particularly preferred for achieving films with high tear-propagation resistances.

The invention claimed is:

1. A biodegradable polyester film comprising:
   i) from 80 to 95% by weight, based on the total weight of components i to ii, of a biodegradable polyester based on aliphatic and/or aromatic dicarboxylic acids and on an aliphatic dihydroxy compound;
   ii) from 5 to 20% by weight, based on the total weight of components i to ii, of polylactic acid;
   iii) from 10 to 20% by weight, based on the total weight of components i to v, of calcium carbonate;
   iv) from 5 to 10% by weight, based on the total weight of components i to v, of talc;
   v) from 0 to 1% by weight, based on the total weight of components i to v, of a copolymer which contains epoxy groups and is based on styrene, acrylic ester, and/or methacrylic ester;
   vi) from 0 to 2% by weight, based on the total weight of components i to v, of 2-(4,6-bisbiphenyl-4-yl-1,3,5-triazin-2-yl)-5-(2-ethyl-(n)-hexyloxy)phenol.

2. The biodegradable polyester film according to claim 1, comprising from 0.01 to 0.5% by weight, based on the total weight of components i to v, of a copolymer which contains epoxy groups and is based on styrene, acrylate, and/or methacrylate.

3. The biodegradable polyester film according to claim 1, wherein the entirety of the fillers iii and iv, based on the total weight of components i to v, is from 15 to 30% by weight.

4. The biodegradable polyester film according to claim 1, which further comprises
   vi) from 0.1 to 1.5% by weight, based on the total weight of components i to v, of 2-(4,6-bisbiphenyl-4-yl-1,3,5-triazin-2-yl)-5-(2-ethyl-(n)-hexyloxy)phenol.

5. A process for producing agricultural products selected from the group consisting of mulch films, protective covering films, silo films, film strips, fabrics, nonwovens, clips, textiles, threads, fishing nets, wrapping, heavy-duty bags, and flower pots which comprises utilizing the polyester film according to claim 4.

6. An agricultural product selected from the group consisting of mulch film, protective covering film, silo film, film strip, fabric, nonwoven, clip, textile, thread, fishing net, wrapping, heavy-duty bag, and flower pot which comprises the polyester film according to claim 4.

7. The biodegradable polyester film according to claim 1, wherein the biodegradable polyester (component i) is an aliphatic-aromatic polyester selected from the group consisting of: polybutylene adipate terephthalate (PBAT), polybutylene sebacate terephthalate (PBSeT), and polybutylene succinate terephthalate (PBST).

8. The biodegradable polyester film according to claim 1, where the biodegradable polyester (component i) is an aliphatic polyester selected from the group consisting of: polybutylene succinate (PBS), polybutylene adipate (PBA), polybutylene succinate adipate (PBSA), polybutylene succinate sebacate (PBSSe), and polybutylene sebacate (PBSe).

9. A process for producing shopping bags, compost bags, or inliners for biodegradable-waste bins which comprises utilizing the polyester film according to claim 1.

10. A shopping bag, compost bag, or inliner for biodegradable-waste bins which comprises the polyester film according to claim 1.

* * * * *